United States Patent
Westwig

[11] 3,797,910
[45] Mar. 19, 1974

[54] FIBER OPTIC DEVICE HAVING SOME FIBERS CLAD WITH ABSORBING GLASSES

[75] Inventor: Ralph A. Westwig, Corning, N.Y.

[73] Assignee: Corning Glass Works, Corning, N.Y.

[22] Filed: Sept. 14, 1971

[21] Appl. No.: 180,365

[52] U.S. Cl. ............................ 350/96 B, 313/92 LF
[51] Int. Cl. ............................................... G02b 5/16
[58] Field of Search ................ 350/96 B; 313/92 LF

[56] References Cited
UNITED STATES PATENTS

| 3,323,886 | 6/1967 | Hays | 350/96 B X |
| 3,247,756 | 4/1966 | Siegmund | 350/96 B |
| 3,506,782 | 4/1970 | Anwyl | 350/96 B X |
| 3,398,669 | 8/1968 | Hicks | 350/96 B X |
| 3,273,445 | 9/1966 | Siegmund | 350/96 B |
| 3,387,959 | 6/1968 | Cole | 350/96 B X |
| 3,436,142 | 4/1969 | Siegmund et al. | 350/96 B |

*Primary Examiner*—David H. Rubin
*Attorney, Agent, or Firm*—William J. Simmons, Jr.

[57] ABSTRACT

Disclosed is a fiber optic device of the type having a plurality of light-conducting optical fibers secured together in side-by-side relation so that corresponding opposite ends of the fibers cooperate to define first and second faces. Some of the fibers have a single cladding of light absorbing material, the remainder of the fibers having a single cladding of non-absorbing material. The combined effect of this combination of fibers results in image transfer devices capable of transferring an image with high resolution and only a moderate loss in light transmission and image storage devices capable of providing high resolution images having moderately high contrast.

9 Claims, 4 Drawing Figures

PATENTED MAR 19 1974 3,797,910

INVENTOR.
Ralph A. Westwig
BY William J. Simmons Jr.
ATTORNEY

3,797,910

FIBER OPTIC DEVICE HAVING SOME FIBERS CLAD WITH ABSORBING GLASSES

BACKGROUND OF THE INVENTION

This invention relates to fiber optic devices such as image transfer devices and image storage devices and more particularly to fiber optic devices constructed of dissimilar fibers.

Fused fiber optic devices are formed of a multiplicity of optical fibers which are secured together in a bundled side-by-side relation, by fusing the fiber claddings together, so that corresponding opposite ends of the fibers cooperate to define end faces. Each fiber has a core of light-transmissive material having a relatively high index of refraction and a cladding of light-transmissive material having a relatively low index of refraction, the core and cladding materials forming an interface which is such that light impinging upon the light receiving end of the core within the acceptance angle of the fiber is incident upon the core-cladding interface at an angle greater than the critical angle of reflection of the interface and is repeatedly reflected from the interface and conducted through the fiber core. Light impinging upon the light receiving end of the core at angles greater than the acceptance angle is incident upon the core-cladding interface at angles smaller than the critical angle thereof and is therefore transmitted through the interface into adjacent fibers as cross-talk therebetween.

Considering, for example, a fiber optic image transfer device, each fiber core must conduct a large part of the light received thereby to its output end in order to reproduce with adequate contrast the received light image. If the light forming the image at the light receiving end of the image-transfer device has a Lambertian distribution, such as light from a cathode ray tube phosphor, some of the light received by the fibers will be partially transmitted through the core-cladding interface as cross-talk, some of the light will be substantially completely transmitted through the interface and may pass through various fibers of the device and other light will be trapped by an individual fiber to be transmitted to the output end thereof by the process of total internal reflection. That light which reaches the output end of the image transfer device at fibers other than that fiber which it entered increases the background light of the output image, reduces the contrast between light and dark image segments and reduces the resolution of the resultant image.

Various techniques have been employed in fiber optic image-transfer devices to limit the amount of light that can be transmitted between fibers and therefore increase the contrast of the output image. One such technique utilizes a light-absorbing glass for the cladding. That light which is transmitted through the core-cladding interface is partially absorbed by each layer of cladding material through which it passes so that the undesirable effects of such light are greatly reduced. The amount of absorption which can be introduced into the cladding material in order to improve resolution is limited because an absorbing cladding decreases the ability of the fiber to transmit light by the process of total internal reflection, since light rays are attenuated by a reflection from an absorbing cladding even though the rays are within the acceptance angle of the optical fiber. This attenuation is due to the finite penetration or tunneling of the light wave into the cladding glass on every reflection. Because of this attenuation, a level of absorption which provides an acceptable compromise between a high contrast image and a sufficiently bright image must be chosen; however, even a slightly absorbing cladding glass will decrease the brightness of the output image.

Another technique for reducing the amount of background light due to cross talk and scattering of light between adjacent fibers employs an extra mural absorbing (EMA) cladding which is applied over the conventional non-absorbing cladding. This technique is superior to the single absorbing cladding in that it permits substantially lossless internal reflection of light received within the acceptance angle of a fiber. That light which passes beyond the interface of the core and non-absorbing cladding is absorbed in the EMA cladding. However, this technique reduces the packing fraction of the image-transfer device since two layers of cladding are required, i.e., the ratio of the core glass area to the area of the entire device is reduced and therefore the amount of light which can be transferred by the plate is also reduced. Moreover, fiber optic devices employing extramural absorption cladding are more difficult to fabricate than those employing single clad fibers. Also, there is a greater chance that defects will occur in the manufacture of devices employing EMA clad fibers since additional steps must be performed in the manufacture of the multi-clad fibers.

Some fiber optic devices comprise a bundle of fibers of highly light-transmissive material in which there is dispersed a number of elements of material having significant light-absorbing properties. Fiber optic image-transfer devices of this type are disclosed in U.S. Pat. No. 3,397,022 issued Aug. 13, 1968 to H. B. Cole. Due to the random disposition of such light absorbing elements throughout the fiber optic image-transfer device, only some of the light passing through the core-cladding interfaces of the fibers can be absorbed. In addition to the aforementioned deficiency, some of the devices taught in that patent are relatively difficult to construct since they include multi-core optical fibers.

SUMMARY OF THE INVENTION

It is an object of the present invention to provide a fiber optic image transfer device which is adapted to transfer an image with faithful reproduction of the contrast between light and dark segments thereof. Another object of the present invention is to provide a high resolution fiber optic device in which a substantial proportion of the cross-sectional area thereof is occupied by core material. Still another object of the present invention is to provide a simply constructed fiber optic device capable of reproducing optical images with high contrast and resolution. A more specific object is to provide a fiber optic image storage device capable of providing high resolution images of moderately high contrast.

Briefly, this invention relates to a fiber optic device comprising a plurality of light-conducting optical fibers secured together in side-by-side relation so that corresponding opposite ends of the fibers cooperate to define end faces. Each of the fibers consists of a core of light transmissive material of a relatively high index of refraction and a single cladding of light transmissive material of relatively low index of refraction. The core end cladding of each of the fibers forms an internally reflective interface to a first type of light entering one of the faces and incident upon the interface at angles greater than the critical angle of reflection of the interface, the interface being transmissive to a second type of light entering one of the faces and incident upon the interface at angles less than the critical angle of reflection, the second type of light passing through the cladding into adjacent fibers. The cladding material of a first plurality of the fibers has a relatively low absorption coefficient so that the first type of light is transmitted through the first plurality of fibers with substantially no attenuation due to reflection at the core-cladding interfaces thereof. The absorption coefficient of the cladding material of the first plurality of fibers is such that the second type of light rays passes therethrough substantially unattenuated. The cladding material of the remainder of the fibers has an absorption coefficient greater than that of the cladding material of the first plurality of fibers so that the first type of light rays encounters losses on each reflection at the core-cladding interface thereof, the second type of light rays being attenuated as it passes through the cladding of the remainder of the fibers.

DESCRIPTION OF THE PREFERRED EMBODIMENTS

Figures 1, 2:
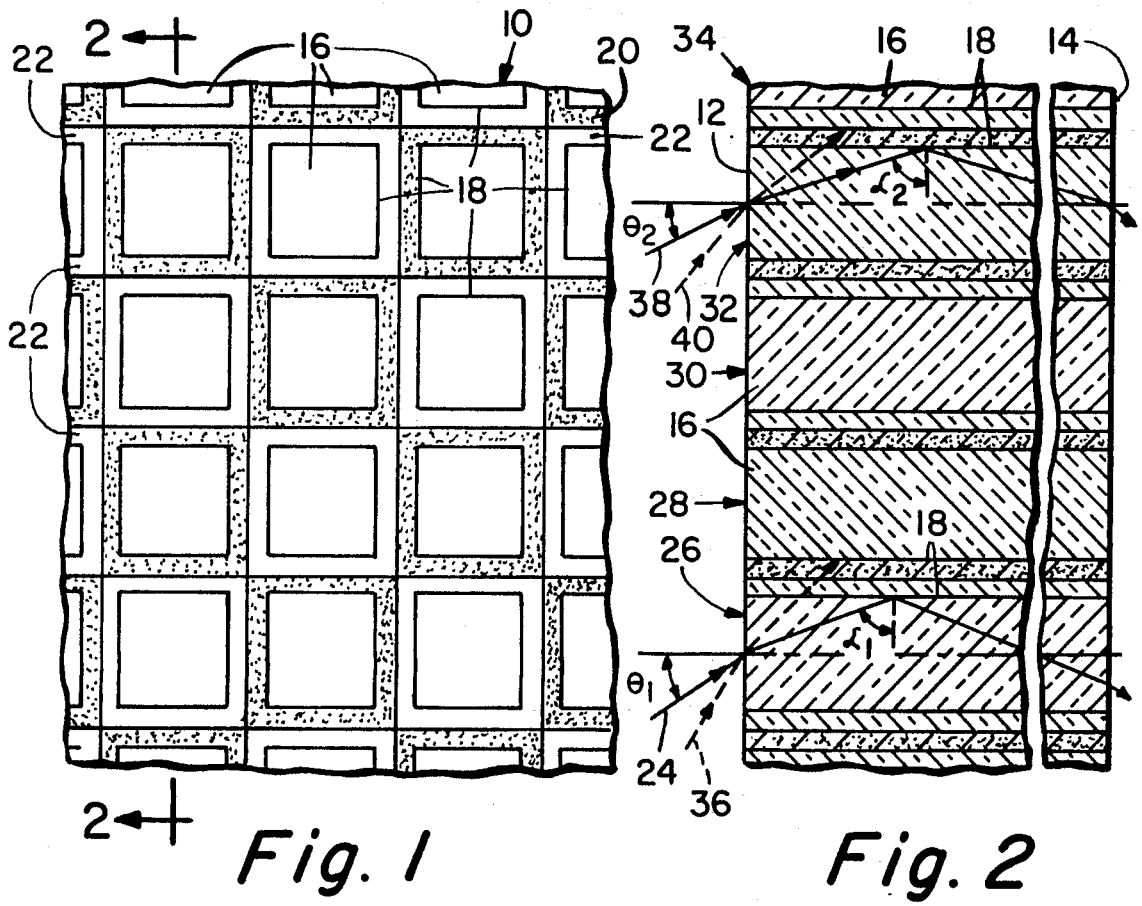
FIG. 1 is a partial view of an end elevation of a fiber optic image transfer device constructed in accordance with the present invention.
FIG. 2 is a cross-sectional view taken along lines 2—2 of FIG. 1. Cross-hatching is omitted for the sake of clarity since this figure is also used fo illustrating light paths within the fibers.

Referring to the drawings, FIGS. 1 and 2 illustrate a portion of an image transfer device 10 which consists of a plurality of optical fibers arranged in a side-by-side bundled relationship, opposite ends of the fibers cooperating to define an image receiving face 12 and an image emitting face 14. Each of the fibers consists of a core 16 of relatively light-transmissive material of relatively high index of refraction surrounded by a cladding of a light-transmissive material of relatively low index of refraction, the fiber core and the cladding forming a light-reflecting interface 18 therebetween.

In accordance with this invention, the cladding material of some of the fibers is formed of a light-absorbing material whereas the remaining fibers are provided with a cladding material which is substantially completely transparent, i.e., it has a very low absorption coefficient. Light absorbing cladding is illustrated in the drawing as being shaded or dotted. In the preferred embodiment illustrated in FIGS. 1 and 2, fibers with absorbing cladding 20 and fibers with non-absorbing cladding 22 are arranged in a checkerboard pattern so that each fiber having a non-absorbing cladding, other than those at the periphery of image transfer device 10 is surrounded by fibers having an absorbing cladding. The technique of the present invention can be described as a modified EMA approach to increasing the resolution of fiber optic devices wherein the difficulties involved in the fabrication of a second concentric cladding are eliminated and a high packing fraction is maintained. The fiber cores 16 may be formed of flint glass having a refractive index of 1.75, and the non-absorbing claddings 22 may be formed of crown glass having a refractive index of 1.52. A neutral light absorbing crown glass suitable for use in forming the absorbing claddings 20 may be made by mixing equal amounts of chromic oxide and gold chloride with a low index crown glass batch during the manufacture thereof. The light absorption properties of the resultant glass will depend upon the amount of these additives in the crown glass batch.

The operation of a fiber optic plate wherein every other fiber is provided with an absorbing cladding material is illustrated in FIG. 2. A maximum acceptance angle $\theta_1$ is shown in FIG. 2 at which a ray of light 24 may enter a fiber 26 and be totally reflected at the interface 18 between the core and cladding of that fiber. The angle $\alpha_1$ is the critical angle of reflection at that interface, all rays of light striking interface 18 at a greater angle than $\alpha_1$ being substantially totally reflected. However, light rays such as ray 36 which enter the fiber at an angle greater than $\theta_1$ will strike the interface 18 at an angle smaller than the critical angle of reflection $\alpha_1$ and will pass into the cladding of the fiber 26. Since this cladding is substantially transparent, light ray 36 will pass therethrough unattenuated and enter the absorbing cladding of adjacent fiber 28 where it will be attenuated. The attenuated light ray 36 could pass through the core of fiber 28 to the absorbing cladding on the side opposite that which the ray entered, where it will be further attenuated. As ray 36 continues to pass through layers of absorbing cladding of fibers laterally disposed with respect to fiber 26, it will be further attenuated so that if it eventually emerges from image emitting face 14, it will contribute only a negligible amount of background light to the emitted image.

Referring now to fiber 32 which is clad wth a light absorbing material, there is illustrated a maximum entrance angle $\theta_2$ at which a ray of light 38 may enter and be substantially totally reflected at the interface 18 between the core and cladding of that fiber. The critical angle of reflection in this situation is the angle $\alpha_2$. However, due to the light absorbing properties of the cladding material of fiber 32, light ray 38 will suffer losses on each reflection at opposing interfaces as it passes through the fiber. These losses depend on the complex Fresnel reflection coefficients, which in turn, depend on the absorption coefficient of the absorbing material. Light rays such as ray 40, which enter the fiber at an angle greater than $\theta_2$ will strike the interface 18 at an angle smaller than critical angle $\alpha_2$ and will refract into the absorbing cladding and be attenuated. Further attenuation of light ray 40 by the absorbing cladding of laterally disposed fibers may occur as described in connection with light ray 36. Thus, the fibers having an absorbing cladding also operate to increase the resolution of the image emitted at face 14, but the transmission of light through these fibers is lossy.

Combining the effects of those fibers having a nonabsorbing cladding and those fibers having an absorbing cladding in a plate of the type illustrated in FIGS. 1 and 2 results in a fiber optic image transfer device which is capable of reproducing at face 14 a light image incident upon face 12 with substantially no loss in resolution and with only a moderate loss in light transmission. The loss depends on the differences in the refractive indices of the core and both claddings as well as the absorption coefficient of the absorbing cladding. Although the cores of fibers having absorbing cladding will generally be made of the same material as the cores of fibers having nonabsorbing cladding, there are situations where different core materials may be preferred. For example, some core materials may not be compatible with a preferred type of absorbing or nonabsorbing cladding so that those cores would have to be made from a material that is compatible with its respective cladding material. Even if all fibers were constructed from the same core material, the refractive indices of the absorbing and nonabsorbing cladding materials would probably differ. Therefore, the acceptance angles and the critical angles of reflection of fibers 26 and 32 are designated by symbols having the subscripts 1 and 2, respectively. Derivation of the angles $\theta$ and $\alpha$ as well as other theoretical and mechanical considerations involved in the field of fiber optics have been discussed extensively in the literature, so further explanation herein is not deemed necessary. One well-recognized discussion of this subject can be found in Chapter 1 of the book "Applied Optics and Optical Engineering," edited by R. Kingslake and published in 1967. Additional discussion relating to the theory and fabrication of optical fibers appears in the aforementioned U.S. Pat. No. 3,397,022.

The fiber optic image transfer device described hereinabove is particularly useful in a cathode ray tube information storage and retrieval system of the type illustrated in FIG. 3. Cathode ray tube 48 has an electron beam 50 which, by coventional techniques, scans a phosphor layer 52 while its amplitude is modulated in accordance with information to be displayed. A photochromic fiber optic plate 54 is disposed a small distance from faceplate 56 by supports 58. Plate 54 comprises a plurality of fibers having absorbing and nonabsorbing cladding arranged in the manner illustrated in FIGS. 1 and 2, the core of each fiber consisting of photochromic glass which is to be hereinafter described. Disposed between phosphor layer 52 and plate 54 is a coating of dichroic filter material 60 which may be formed on plate 54 by an evaporating technique. Dichroic coating 60 is typically a multilayered film which is so constructed that it passes ultraviolet light and reflects visible light.

Ultraviolet light generated by electron beam 50 striking phosphor layer 52 passes through dichroic coating 60 and darkens selected ones of the photochromic cores, thereby storing an image in plate 54 which is determined by those of the photochromic cores which have been darkened. Information is read out of the plate 54 by projecting a collimated beam of probing light represented by arrows 62 through a beam splitter 64 so that it projects through faceplate 56 and into the fibers of plate 54. The probing light is reflected from dichroic layer 60 and passes back through the fibers of the plate 54, portions of the probing light beam being attenuated by passing twice through those fibers which have been darkened by ultraviolet light generated by phosphor layer 52. The image containing light beam represented by arrows 66 is reflected by beam splitter 64 to an optical system (not shown) whereby an image may be directly viewed or projected.

Photochromic glass is one wherein the color or optical density thereof can be changed upon exposure to radiations of certain wavelengths and the original color returned thereto when the actinic radiation is removed and/or the glass is exposed to radiations of different wavelengths. Photochromic glass usually becomes darkened by exposure to ultraviolet radiation, and the darkened areas can be bleached or erased by red or infrared radiation. The information contained in the glass persists therein for reasonable times while the glass is being read by passing therethrough radiation of a neutral wavelength which is usually green light.

U. S. Pat. No. 3,208,860 comprises the basic disclosure concerning photochromic glasses. That patent describes glass compositions containing crystals of silver halides dispersed in a glassy matrix, which crystals darken when exposed to ultraviolet radiations and return to their original state when the ultraviolet radiation is removed. This phenomenon displayed by these crystals imparts to the glass the characteristic of reversible darkening dependent upon the amount of actinic radiation incident thereof. Whereas U.S. Pat. No. 3,208,860 discloses that any glass containing crystals of silver chloride and/or silver bromide and/or silver iodide will exhibit some photochromic behavior, that patent also points out that the character of this behavior is dependent upon the overall composition of the glass and cites the following preferred ranges of ingredients: 40–76% $SiO_2$, 4–26% $Al_2O_3$, 4–26% $B_2O_3$, at least one alkali metal oxide selected from the group consisting of 2–8% $Li_2O$, 4–15% $Na_2O$, 6–20% $K_2O$, 8–25% $Rb_2O$, and 10–30% $Cs_2 O$, at least one halogen in the indicated minimum effective proportion of 0.2% chlorine, 0.1% bromine, and 0.08% iodine, and a minimum of silver in the indicated proportion of 0.2% in a glass wherein the effective halogen is chlorine, 0.05% in a glass containing at least 0.1% bromine but containing less than 0.08% iodine, and 0.03% in a glass which contains at least 0.08% iodine.

A family of photochromic core glasses suitable for use as fiber optic core glass is described in copending patent application Ser. No. 801,562 filed Feb. 24, 1969, commonly assigned herewith. That application teaches that glasses exhibiting a refractive index higher than 1.52, such as to be effective as a core element of an optical fiber, and demonstrating very satisfactory photochromic properties can be secured from glasses in the preferred composition range of U.S. Pat. No. 3,208,860 to which about 10–50% by weight tantalum computed as $Ta_2O_5$, has been added. At the high additions of $Ta_2O_5$, $SiO_2$ and/or $Al_2O_3$ and/or $B_2O_3$ are replaced therewith. Thus, excluding the silver and halogen components, the glasses disclosed in copending application Ser. No. 801,562 consist essentially, by weight on the oxide basis, of about 30–76% $SiO_2$, 0–26% $Al_2O_3$, 4–26% $B_2O_3$, 10–50% $Ta_2O_5$, and at least one alkali metal oxide selected from the group consisting of 2–8% $Li_2O$, 3–15% $Na_2O$, 6–20% $K_2O$, 8–25% $Rb_2O$, and 10–30% $Cs_2O$.

In addition to possessing a relatively low refractive index, a cladding glass should be compatible with the core glass. Generally, the thermal coefficient of expansion (TCE) of the cladding glass is important since a bad mismatch of core and cladding TCE often leads to poor bonding and crazing of the cladding during fiber manufacture. Moreover, when the core glass is a photochromic glass, a cladding glass must be selected which will not poison or deleteriously effect the photochromic properties of the core glass. Since the photochromic glass cores of fiber optic plate 54 of FIG. 3 are activated or darkened by ultraviolet light generated by phosphor layer 52, the absorbing cladding glass must absorb ultraviolet light and the non-absorbing cladding glass must be highly transmissive to ultraviolet light if a high resolution image is to be written into this plate by the darkening of selected photochromic glass cores. Families of glasses suitable for use as the ultraviolet absorbing cladding and the non-absorbing cladding are described in copending application Ser. No. 115,370 filed Feb. 16, 1971, commonly assigned herewith. This application discloses an area of alkali boroaluminosilicate glass composition which can be used to fabricate non-absorbing cladding glasses. These non-absorbing glasses consist essentially, in weight percent on the oxide basis as calculated from the batch, of about 50–67% $SiO_2$, 5–15% $Al_2O_3$, 5–25% $B_2O_3$, 0–5% $Li_2O$, 0–12% $Na_2O$, 0–10% $K_2O$, and 0–5% $Cs_2O$, wherein $[2Li_2O + Na_2O + K_2O + ½Cs_2O]$ totals at least about 10%. For ultraviolet absorbing cladding, the above-described compositions may additionally contain, in weight percent on the oxide basis as calculated from the batch, up to about 10% of oxides selected in the indicated proportions from the group consisting of 0–10% $CeO_2$ and 0–10% $TiO_2$, the ability of the resultant glass to absorb ultraviolet light depending on the amount of these latter two oxides in the batch.

Figures 3, 4:
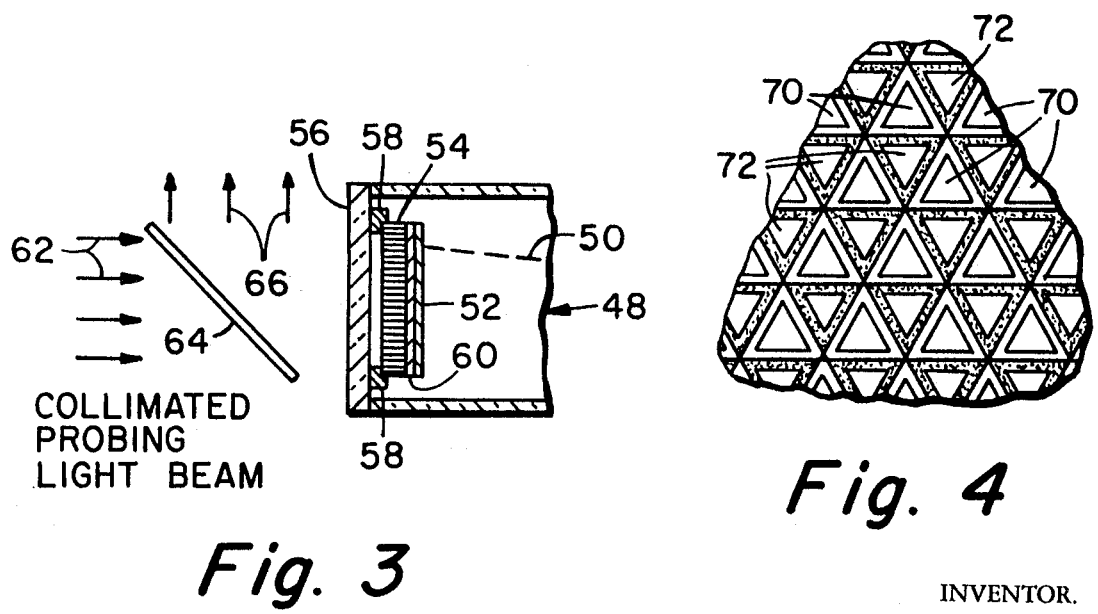
FIG. 3 is a diagrammatic view of an image storage device embodying a photochromic fiber optic plate made in accordance with the present invention.
FIG. 4 is a partial end elevation view of another embodiment of this invention.

A photochromic fiber optic plate of the type illustrated in FIG. 3 is more likely to be adversely affected by light entering the fiber cores at angles greater than the acceptance angle than the image transfer device of FIGS. 1 and 2. Light entering a core of an image transfer device at an angle greater than the acceptance angle may travel through many fibers which are laterally disposed with respect to that fiber which it entered before exiting from the image emitting face of the device. Only that portion of the light impinging on the core at angles greater than the acceptance angle and thereafter emerging from the image emitting face contributes to the background light which decreases both resolution and contrast. However, in an image storage device wherein each core consists of photochromic material, any light which is refracted at the core-cladding interface and passes through the cladding into the adjacent photochromic core darkens that core and decreases the resolution of an image projected from the plate in the manner described in conjunction with FIG. 3. It may therefore be necessary to utilize in a photochromic fiber optic plate cladding material having a higher absorption coefficient than would be required for an image transfer device, due to the undesirable darkening which can occur in fibers adjacent to that fiber in which a ray of light has entered at an angle greater than the acceptance angle.

Geometries other than the checkerboard pattern of square fibers illustrated in FIG. 1 can be utilized to provide fiber optic devices capable of providing high resolution images with only moderate loss in light transmission. For example, the array of triangular fibers in FIG. 4 is such that a fiber 72 having an absorbing cladding is disposed adjacent each side of those fibers 70 which have nonabsorbing cladding.

It may be desirable for certain applications to provide a brighter image having lower contrast than that which is afforded by the embodiment of FIGS. 1 and 4. In such a modified embodiment, every third or every fourth fiber could be provided with absorbing cladding. The output image would be brighter because a higher percentage of the fibers in the device would have substantially transparent cladding which permits low loss transmission of light therethrough. The contrast of such a device would be reduced since light rays passing laterally through the core-cladding interfaces would encounter less fibers having absorbing cladding.

I claim:

1. A fiber optic device of the type which is adapted to receive and conduct segments of a light image, said fiber optic device comprising a plurality of light-conducting optical fibers secured together in side-by-side relation so that corresponding opposite ends of the fibers cooperate to define end faces, each of said fibers consisting of a core of light transmissive material of a relatively high index of refraction and a single cladding of light transmissive material of relatively low index of refraction, the core and cladding of each of said fibers forming an internally reflective interface to first light rays of said light image entering one of said faces and incident upon said interface at angles greater than the critical angle of reflection of said interface, said interface being transmissive to second light rays of said light image entering one of said faces and incident upon said interface at angles less than said critical angle of reflection, said second light rays passing through said cladding into adjacent fibers, the cladding material of a plurality of said fibers having a relatively low absorption coefficient so that said first light rays are transmitted through said plurality of fibers with substantially no attenuation due to reflection at the core-cladding interfaces thereof, the absorption coefficient of the cladding material of said plurality of fibers being such that said second light rays pass therethrough substantially unattenuated, the cladding material of the remainder of said fibers having an absorption coefficient greater than that of the cladding material of said plurality of fibers so that said first light rays encounter losses on each reflection at the core-cladding interface thereof, said second light rays being attenuated as they pass through the cladding of said remainder of said fibers, said plurality of fibers and said remainder of said fibers having substantially the same cross-sectional area and shape, said remainder of said fibers being uniformly dispersed throughout said device, each of said fibers having at least three elongated sidewall surface portions, each of the surface portions of each of said plurality of fibers being disposed adjacent to a surface portion of one of said remainder of said fibers so that a surface portion of absorbing cladding material is always adjacent to a surface portion of non-absorbing cladding material.

2. A fiber optic device in accordance with claim 1 wherein the cores of each of said fibers consists of photochromic glass which is activated by a given wavelength of light, the cladding material of each of said remainder of said fibers consisting of glass that absorbs light of said given wavelength so that darkening of fibers due to light passing through the cladding of adjacent fibers is substantially reduced.

3. A fiber optic device in accordance with claim 2 wherein each of said fibers has a square cross-sectional shape.

4. A fiber optic device in accordance with claim 2 wherein said photochromic glass is activated by ultraviolet light and the cladding material of the remainder of said fibers consists of ultraviolet light absorbing glass.

5. A fiber optic device in accordance with claim 1 wherein each of said fibers has a square cross-sectional shape.

6. A fiber optic device in accordance with claim 1 wherein each of said fibers has a triangular cross-sectional shape.

7. A fiber optic device comprising a plurality of light-conducting optical fibers secured together in side-by-side relation so that corresponding opposite ends of the fibers cooperate to define end faces, each of said fibers consisting of a core of light transmissive material of a relatively high index of refraction and a single cladding of light transmissive material of relatively low index of refraction, the core and cladding of each of said fibers forming a light reflecting interface, said individual fiber cores being adapted to receive light of a given wavelength therein at one end from respective segments of a light image formed on one of said end faces and to conduct at least a part of said light toward the opposite ends thereof, the cladding material of a plurality of said fibers having a relatively low absorption coefficient at said given wavelength so that light of said given wavelength is transmitted through said plurality of fibers with substantially no attenuation due to reflection at the core-cladding interfaces thereof, the cladding material of the remainder of said fibers having an absorption coefficient at said given wavelength greater than that of the cladding material of said plurality of fibers, said plurality of fibers and said remainder of said fibers having substantially the same cross-sectional area and shape, each of said fibers having at least three elongated sidewall surface portions, each of the surface portions of each of said plurality of fibers being disposed adjacent to a surface portion of one of said remainder of said fibers so that a surface portion of absorbing cladding material is always adjacent to a surface portion of non-absorbing cladding material.

8. A fiber optic device in accordance with claim 7 wherein the cores of each of said fibers consists of photochromic glass which is activated by light of said given wavelength.

9. In an optical system of the type comprising means for providing a distribution of light across a given area in a plane, at least a portion of said light being of a given wavelength, and a fiber optic device consisting of a plurality of light-conducting optical fibers secured together in side-by-side relation so that corresponding opposite ends of the fibers cooperate to define end faces, one of said end faces lying within said given area in said plane, each of said fibers consisting of a core of light transmissive material of a relatively high index of refraction and a single cladding of light transmissive material of relatively low index of refraction, the core and cladding of each of said fibers forming a light reflecting interface, said fiber optic device being disposed in light receiving relationship with respect to said means for providing a distribution of light, said individual fiber cores being adapted to receive light therein at one end from respective segments of said distribution of light and to conduct at least a part of said light toward the opposite ends thereof, said fiber optic device being characterized in that the cladding material of a plurality of said fibers has a relatively low absorption coefficient at said given wavelength so that light of said given wavelength is transmitted through said plurality of fibers with substantially no attenuation due to reflection at the core-cladding interfaces thereof, and the cladding material of the remainder of said fibers has an absorption coefficient greater than that of the cladding material of said plurality of fibers, said plurality of said fibers and said remainder of said fibers having the same cross-sectional area and shape, each of said fibers having at least three elongated sidewall surface portions, each of the surface portions of each of said plurality of fibers being disposed adjacent to a surface portion of one of said remainder of said fibers so that a surface portion of absorbing cladding material is always adjacent to a surface portion of non-absorbing cladding material.

* * * * *